US010637054B2

(12) United States Patent
Yuge et al.

(10) Patent No.: US 10,637,054 B2
(45) Date of Patent: Apr. 28, 2020

(54) POSITIVE ELECTRODE MATERIAL FOR LITHIUM ION SECONDARY BATTERIES, AND METHOD FOR PRODUCING SAME

(71) Applicant: NEC Corporation, Tokyo (JP)

(72) Inventors: Ryota Yuge, Tokyo (JP); Kentaro Nakahara, Tokyo (JP); Sadanori Hattori, Tokyo (JP)

(73) Assignee: NEC Corporation, Tokyo (JP)

( * ) Notice: Subject to any disclaimer, the term of this patent is extended or adjusted under 35 U.S.C. 154(b) by 293 days.

(21) Appl. No.: 14/895,650

(22) PCT Filed: Jun. 5, 2014

(86) PCT No.: PCT/JP2014/065014
§ 371 (c)(1),
(2) Date: Dec. 3, 2015

(87) PCT Pub. No.: WO2014/196615
PCT Pub. Date: Dec. 11, 2014

(65) Prior Publication Data
US 2016/0126549 A1    May 5, 2016

(30) Foreign Application Priority Data

Jun. 6, 2013  (JP) .................................. 2013-120109

(51) Int. Cl.
| | |
|---|---|
| *H01M 4/525* | (2010.01) |
| *H01M 4/505* | (2010.01) |
| *H01M 10/0525* | (2010.01) |
| *C01G 53/00* | (2006.01) |
| *H01M 4/04* | (2006.01) |
| *H01M 4/1391* | (2010.01) |
| *H01M 4/131* | (2010.01) |
| *H01M 4/36* | (2006.01) |

(52) U.S. Cl.
CPC ............ *H01M 4/525* (2013.01); *C01G 53/50* (2013.01); *H01M 4/0428* (2013.01); *H01M 4/131* (2013.01); *H01M 4/1391* (2013.01); *H01M 4/366* (2013.01); *H01M 4/505* (2013.01); *H01M 10/0525* (2013.01); *C01P 2004/61* (2013.01); *C01P 2004/62* (2013.01); *C01P 2004/80* (2013.01); *C01P 2004/84* (2013.01); *H01M 2220/20* (2013.01); *H01M 2220/30* (2013.01)

(58) Field of Classification Search
CPC .. H01M 4/505; H01M 4/525; H01M 10/0525; H01M 4/0428; H01M 4/131; H01M 4/1391; H01M 4/366; H01M 2220/20; H01M 2220/30
See application file for complete search history.

(56) References Cited

U.S. PATENT DOCUMENTS

| | | | | | |
|---|---|---|---|---|---|
| 2002/0009646 | A1* | 1/2002 | Matsubara | .............. | H01M 2/32 429/231.8 |
| 2006/0134516 | A1* | 6/2006 | Im | ......................... | H01M 4/133 429/218.1 |
| 2006/0215352 | A1* | 9/2006 | Take | ..................... | H01G 9/012 361/523 |
| 2010/0248032 | A1* | 9/2010 | Pitteloud | ............ | C01G 45/1228 429/221 |
| 2010/0310939 | A1* | 12/2010 | Yoshida | ................ | H01M 4/366 429/231.8 |
| 2011/0244334 | A1* | 10/2011 | Kawada | .................. | C23C 16/26 429/231.8 |
| 2012/0295155 | A1* | 11/2012 | Deng | ..................... | H01B 1/122 429/200 |
| 2013/0337317 | A1* | 12/2013 | Shima | ................. | H01M 10/052 429/188 |
| 2014/0113190 | A1* | 4/2014 | Kong | .................... | H01M 4/366 429/212 |
| 2014/0255781 | A1* | 9/2014 | Son | ....................... | H01M 4/366 429/215 |
| 2014/0356726 | A1* | 12/2014 | Han | ..................... | H01M 4/386 429/231.8 |
| 2014/0377643 | A1* | 12/2014 | Lee | ..................... | H01M 4/1395 429/188 |

FOREIGN PATENT DOCUMENTS

| | | |
|---|---|---|
| JP | 2003-308845 A | 10/2003 |
| JP | 3691279 B2 | 9/2005 |
| JP | 2006-036621 A | 2/2006 |

(Continued)

OTHER PUBLICATIONS

International Search Report corresponding to PCT/JP2014/065014, dated Aug. 12, 2014 (3 pages).

(Continued)

*Primary Examiner* — Muhammad S Siddiquee
(74) *Attorney, Agent, or Firm* — Wilmer Cutler Pickering Hale and Dorr LLP

(57) ABSTRACT

The present invention relates to a lithium manganese composite oxide having a metal-containing compound film and a carbon coating, in which at least a part of a surface of the lithium manganese composite oxide represented by Formula (1) is coated with the metal-containing compound film, and at least a part of the surface thereof is further coated with the carbon coating. The present invention can provide a positive electrode material capable of improving the discharge characteristics and the capacity retention rate after cycles of lithium ion secondary batteries.

$$Li_{1+x}(Fe_yNi_zMn_{1-y-z})_{1-x}O_2 \tag{1},$$

where $0<x<1/3$, $0 \le y$, $0 \le z<0.5$, and $y+z<1$.

11 Claims, 2 Drawing Sheets

(56) References Cited

FOREIGN PATENT DOCUMENTS

| | | |
|---|---|---|
| JP | 2007-103339 A | 4/2007 |
| JP | 3940788 B2 | 7/2007 |
| JP | 2009-224307 A | 10/2009 |
| JP | 2009-245762 A | 10/2009 |
| JP | 2010-021125 A | 1/2010 |
| JP | 2010-50079 A | 3/2010 |
| JP | 2011-70789 A | 4/2011 |
| JP | 2011-181375 A | 9/2011 |
| JP | 4963059 B2 | 6/2012 |
| JP | 2012-169217 A | 9/2012 |
| JP | 2014-086418 A | 5/2014 |
| WO | WO-2010/035681 A1 | 4/2010 |

OTHER PUBLICATIONS

Japanese Office Action issued by the Japan Patent Office for Japanese Application No. 2015-521496 dated May 29, 2018 (7 pages).

Notification of Reasons for Refusal issued by the Japan Patent Office for Japanese Application No. 2015-521496 dated Sep. 4, 2018 (6 pages).

* cited by examiner

POSITIVE ELECTRODE MATERIAL FOR LITHIUM ION SECONDARY BATTERIES, AND METHOD FOR PRODUCING SAME

CROSS-REFERENCE TO RELATED APPLICATIONS

This application is a national stage application of International Application No. PCT/JP2014/065014 entitled "Positive Electrode Material for Lithium Ion Secondary Batteries, and Method for Producing Same," filed on Jun. 5, 2014, which claims the benefit of the priority of Japanese Patent Application No. 2013-120109, filed on Jun. 6, 2013, the disclosures of each which are hereby incorporated by reference in its entirety.

TECHNICAL FIELD

The present invention relates to a positive electrode material for lithium ion secondary batteries and a method for producing the positive electrode material. Specifically, it relates to a positive electrode material for lithium ion batteries that has good rate characteristics and excellent cycle characteristics when used as a positive electrode active material for lithium ion secondary batteries and a method for producing thereof, and further relate to a secondary battery using the positive electrode material.

BACKGROUND ART

In recent years, with development of various devices and systems, performance improvement of storage batteries as power sources has been demanded. In particular, lithium ion batteries are widely used as secondary batteries serving as power sources of electronic devices such as mobile communication devices and notebook computers. Further, for reducing the environmental load, they have been rapidly expected also as batteries for driving motors of automobiles and stationary storage batteries, and thus further improvement in capacity has been desired.

In lithium ion batteries, lithium cobalt oxide ($LiCoO_2$) is mainly used as a positive electrode material. However, it is one of the causes of increasing the cost of lithium ion batteries due to a large content of cobalt that is a rare metal. Particularly for in-vehicle use or the like, since the size of batteries increases, use of $LiCoO_2$ is difficult due to its high cost.

As a substitute material for lithium cobalt oxide, lithium nickel oxide ($LiNiO_2$) and lithium manganese oxide ($LiMn_2O_4$) and the like, which are made of elements that are inexpensive and abundant as natural resources, have been used in some cases. However, $LiNiO_2$ has a problem of reducing the battery safety during charge. Further, $LiMn_2O_4$ may cause deterioration of battery characteristics due to dissolution of divalent Mn into the electrolyte during charge and discharge at high temperature.

As means for overcoming the above-described problem, Patent Literature 1 discloses a lithium manganese composite oxide containing Ti for preventing the dissolution of Mn. Patent Literature 2 discloses a lithium ferrite composite oxide containing Fe for further reducing the cost. Patent Literature 3 discloses a method for producing a lithium ferrite composite oxide produced using a manganese compound, an iron compound, and a nickel compound. Patent Literature 4 discloses a method for coating surfaces of particles of an electrode material with carbon using an organic compound consisting of four benzene rings such as pyrene. Patent Literature 5 discloses a technique for improving the structural and thermal stability by coating the surface of a positive electrode material with a metal oxide. Patent Literature 6 discloses a carbon-coated lithium transition metal-containing compound in which not less than 85% of the surface of a lithium transition metal-containing compound is coated with a carbon material.

CITATION LIST

Patent Literature

Patent Literature 1: Japanese Patent No. 4963059
Patent Literature 2: Japanese Patent No. 3940788
Patent Literature 3: Japanese Patent Laid-Open No. 2006-036621
Patent Literature 4: Japanese Patent Laid-Open No. 2009-245762
Patent Literature 5: Japanese Patent No. 3691279
Patent Literature 6: Japanese Patent Laid-Open No. 2003-308845

SUMMARY OF INVENTION

Technical Problem

However, the methods disclosed in the above-described patent literatures are not sufficient to overcome the problems of low discharge characteristics and low durability that tend to be problematic in a layered $Li_2MnO_3$-based Li-excess positive electrode that is capable of increasing the capacity and reducing the cost of lithium ion secondary batteries, thus leaving room for improvement. It is an object of the present invention to provide a positive electrode material capable of improving these problems.

Solution to Problem

An aspect of the present invention relates to a lithium manganese composite oxide having a metal-containing compound film and a carbon coating, wherein at least a part of a surface of a lithium manganese composite oxide represented by Formula (1) is coated with the metal-containing compound, and at least a part of the surface thereof is further coated with the carbon coating.

$$Li_{1+x}(Fe_yNi_zMn_{1-y-z})_{1-x}O_2 \qquad (1),$$

where $0<x<1/3$, $0 \leq y$, $0 \leq z < 0.5$, and $y+z<1$.

Another aspect of the present invention relates to a method for producing a lithium manganese composite oxide having a metal-containing compound film and a carbon coating, comprising the steps of:
coating at least a part of a surface of a lithium manganese composite oxide represented by Formula (1) with the metal-containing compound; and further
coating, with the carbon coating, at least a part of the surface of the lithium manganese composite oxide coated with the metal-containing compound.

Advantageous Effects of Invention

By using the lithium manganese composite oxide having a metal-containing compound film and a carbon coating according to the present invention as a positive electrode material of a lithium secondary battery, a lithium ion battery having high discharge rate characteristics and suppressing a reduction in capacity retention rate after cycles can be provided.

DESCRIPTION OF EMBODIMENTS

In a lithium manganese composite oxide having a metal-containing compound film and a carbon coating according to an embodiment of the present invention, at least a part of a surface of a Li-excess lithium manganese composite oxide represented by Formula (1) below is coated with a metal-containing compound, and at least a part of the surface thereof is further coated with the carbon coating.

$$Li_{1-x}(Fe_yNi_zMn_{1-y-z})_{1-x}O_2 \quad (1),$$

where $0<x<1/3$, $0 \leq y$, $0 \leq z < 0.5$, and $y+z<1$.

The surface of the lithium manganese composite oxide used as a positive electrode material (positive electrode active material) is coated with the metal-containing compound, thereby reducing oxygen generation during charge and discharge and suppressing the dissolution of metals from the positive electrode material. Further, the surface thereof is coated with the carbon coating, thereby improving the conductivity. Thus, a lithium ion battery in which the C rate characteristics are improved, and a reduction in capacity retention rate after cycles is suppressed can be achieved. Here, 1C is defined as electric discharge in 1 hour to a predetermined voltage, and the C rate represents discharge characteristics.

Hereinafter, embodiments of the present invention will be described.

Figure 1:
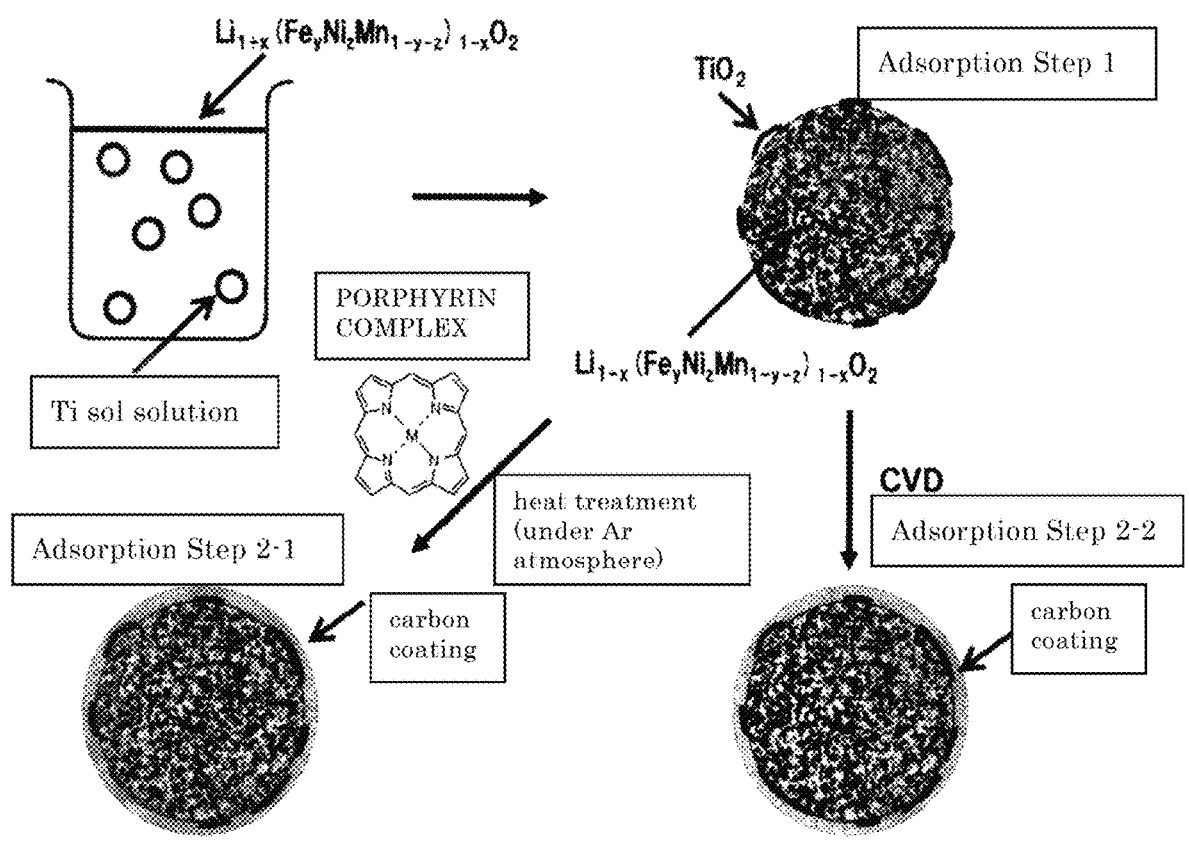
FIG. 1 is a view schematically showing the structure of a lithium manganese composite oxide having a metal-containing compound film and a carbon coating according to an embodiment of the present invention and the outline of a method for producing thereof.

FIG. 1 shows a schematic view of a structure of a lithium manganese composite oxide having a metal-containing compound film and a carbon coating according to an embodiment of the present invention, and shows an example of the production process of the lithium manganese composite oxide.

In this embodiment, at least a part of a surface of the above-described lithium manganese composite oxide represented by Formula (1) (which hereinafter may be referred to simply as "lithium manganese composite oxide") is coated with the metal-containing compound.

Examples of the metal-containing compound to coat the surface include compounds containing metals such as Ti, Al, Fe, Mg, K, Na, Zn, Ce, Ca, Zr, Ge, and Sn, and particularly, oxides and phosphate compounds of these metals are preferable. Specifically, $TiO_2$, $Al_2O_3$, $FePO_4$, $MgO$, $CeO_2$, $ZnO$, $SnO_2$, $ZrO_2$, and $AlPO_4$ can be mentioned, for example, but there is no limitation to these. These metal-containing compounds may be used alone or in a mixture of two or more of these.

The mass of these metal-containing compounds is generally not less than 0.01% and not more than 20%, preferably not less than 0.05% and not more than 10%, more preferably not less than 0.1% and not more than 5%, with respect to the mass of the lithium manganese composite oxide represented by Formula (1). Further, the metal-containing compound covers the surface of the above-described lithium manganese composite oxide in the range of generally not less than 0.01% and not more than 80%, preferably not less than 0.1% and not more than 60%, more preferably not less than 5% and not more than 50%. By coating not less than 5% of the surface, the effect of suppressing oxygen generation and dissolution of active materials during charge and discharge is high.

The lithium manganese composite oxide represented by Formula (1) in this embodiment is coated with the metal-containing compound as described above, and is further coated with the carbon coating thereon.

The carbon content is generally more than 0 mass % and not more than 30 mass %, preferably more than 0 mass % and not more than 20 mass %, with respect to the mass of the lithium manganese composite oxide represented by Formula (1) above. An excessively high carbon content causes a reduction in battery capacity, which may possibly be impractical. The carbon content can be calculated, for example, from the reduced weight by measuring the weight of a sample through combustion of carbon components therein under oxygen atmosphere at about 400 to 700° C.

It should be noted that the average particle size of the lithium manganese composite oxide represented by Formula (1) is generally in the range of 0.1 to 100 μm, preferably in the range of 0.5 to 50 μm, more preferably in the range of 1 to 30 μm, further preferably in the range of 5 to 25 μm, in view of the reactivity with the electrolyte and the rate characteristics. Here, the average particle size means a particle size at a cumulative percentage of 50% (median diameter: D50) in a particle size distribution (volumetric basis) by a laser diffraction scattering method.

(Method for Producing Lithium Manganese Composite Oxide Having Metal-Containing Compound Film and Carbon Coating)

In this embodiment, the lithium manganese composite oxide having a metal-containing compound film and a carbon coating can be produced by coating at least a part of a surface of the lithium manganese oxide represented by Formula (1) with the metal-containing compound and thereafter further coating at least a part of the surface thereof with the carbon coating.

[Formation of Metal-Containing Compound Film]

The method for coating the lithium manganese composite oxide represented by Formula (1) with the metal-containing compound is not specifically limited, but examples thereof include a method in which a film of the metal-containing compound is formed by allowing a metal compound to be adsorbed onto a surface of a lithium manganese composite oxide, and further subjecting it to a heat treatment, as needed.

The method for allowing the metal compound to be adsorbed onto the surface of the lithium manganese composite oxide represented by Formula (1) is not specifically limited, which may be performed in the solid phase, or may be performed by a liquid phase method or the like. Specifically, it can be adsorbed onto the surface, for example, by mixing particles of the metal compound and the lithium manganese composite oxide represented by Formula (1) in the solid phase. Alternatively, the lithium manganese composite oxide may be dispersed and mixed in a solution in which the metal compound has been dissolved, or the lithium manganese composite oxide may be dispersed and mixed in a suspension formed from the metal compound such as a metal sol solution. A solvent and a dispersion medium to be used in the liquid phase method are not specifically limited, and examples thereof include aqueous solvents, organic solvents, and organic solvent-water mixed solvents such as alcohol-water solvents.

Examples of the metal compound that can be used for formation of the metal-containing compound film include metal inorganic salts, metal oxides, and organometallic compounds of metals such as Ti, Al, Fe, Mg, K, Na, Zn, Ce, Ca, Zr, Ge, and Sn. Also in the case of the liquid phase method, any compound can be used without particular limitation as long as it can be dissolved or dispersed in an organic solvent or an aqueous solvent, and a water-insoluble compound also can be used as long as it is a compound that can be dissolved using an acid or the like so as to be used as an aqueous solution. Specifically, examples thereof include metal inorganic salts such as halides (such as chlorides), nitrates, sulfates, carbonates, hydroxides, and phosphates; organometallic compounds such as salts of organic matter, e.g., carboxylic acid salts (such as formates, acetates, propionates, oxalates, and lactates); and metal oxides. Further, metal alkoxides (for example, alkoxide having 1 to 20 carbon atoms such as methoxide, ethoxide, propoxide, isopropoxide, butoxide, isobutoxide, and t-butoxide) and metal complexes of the above-described metals are also preferably used, and examples of the ligand of the metal complexes include $H_2O$, $NH_3$, $O_2^-$, $Cl^-$, $CN^-$, and $NCS^-$.

These metal compounds may be used alone or in a mixture of two or more of these.

In the step of allowing the metal compound to be adsorbed onto the lithium manganese composite oxide represented by Formula (1), the mixing ratio of the above-described metal compound and the lithium manganese composite oxide represented by Formula (1) is not specifically limited, but it is preferably 0.1:99.9 to 20:80, more preferably 1:99 to 10:90, by mass ratio.

As an example of the method for forming the metal-containing compound film, a method for forming the metal-containing compound film using a metal sol will be described with reference to the schematic view shown in FIG. 1.

[Adsorption step 1]

A Li-excess lithium manganese composite oxide represented by Formula (1) is dispersed in a solution in which a sol of a metal compound has been dispersed, followed by stirring, thereafter filter separation, and sufficient drying. Thereafter, heat treatment is applied thereto, thereby allowing the metal sol adsorbed on the surface to be fixed to the surface of a lithium manganese composite of Formula (1) as a metal-containing compound (Adsorption step 1 in FIG. 1). This heat treatment step can be performed at 400 to 1000° C. It is performed preferably at 400 to 800° C., more preferably at 400 to 700° C. Further, the heat treatment step can be performed under air, nitrogen, hydrogen, inert gas atmosphere, or mixed atmosphere of these, but it is desirably performed under air atmosphere in view of cost or the like. The heat treatment time is not specifically limited, but is preferably not less than 30 minutes, more preferably not less than 3 hours, and preferably not more than 24 hours. At this time, the adsorbed metal-containing compound and the lithium manganese composite oxide represented by Formula (1) may be bonded or fused through a reaction at their interface.

Examples of the metal sol that is used in Adsorption step 1 include sols of metals such as Ti, Al, Fe, Mg, K, Na, Zn, Ce, Ca, Zr, Ge, and Sn, and in particular, sols of metals such as Ti, Al, Zr, Sn, and Fe are preferable.

Metal compounds to give sol solutions of these metals are not specifically limited, but examples thereof include organometallic compounds such as alkyl titanate, and metal alkoxides such as titanium alkoxide, aluminum alkoxide, zirconium alkoxide, and tin alkoxide. The dispersion medium is not specifically limited, and water, alcohol, or a water-alcohol mixture, for example, can be used, among which the water-alcohol mixture is preferable because of its excellent dispersibility of metal sols. Other than these, a metal sol solution obtained by a known method may be used.

The use amount of the dispersion medium is not specifically limited, but it is used so that the concentration (solid content) of the metal sol solution or the like is preferably 0.1 to 1000 g/L, more preferably 1 to 100 g/L.

Hereinafter, more specific examples will be described, but the present invention is not limited to these examples.

For example, in the case of using Ti sol, the Ti sol can be produced by mixing butyl titanate dissolved in ethanol with a mixed solution of ethanol, water, and acetic acid. The lithium manganese composite oxide of Formula (1) is mixed with the resultant Ti sol solution, and the Ti sol is adsorbed onto the surface of the lithium manganese composite oxide, followed by filter separation and drying. Thereafter, it is subjected, for example, to heat treatment at 500° C., thereby allowing Ti oxide ($TiO_2$) to be fixed to the surface of the lithium manganese composite of Formula (1).

As another example of a suspension of the metal compound, a suspension obtained from a metal inorganic salt and a phosphate, for example, can be mentioned. For example, a suspension of $AlPO_4$ can be prepared by mixing aluminum nitrate ($Al(NO_3)_3 \cdot 9H_2O$) and ammonium phosphate (diammonium hydrogenphosphate, $(NH_4)_2HPO_4$) at a suitable ratio in water. The lithium manganese composite oxide of Formula (1) is mixed with the resultant suspension, and $AlPO_4$ is adsorbed onto the surface of the lithium manganese composite oxide. Thereafter, it is dried and calcined at 400 to 800° C. under air or inert gas atmosphere, and thus a film containing $AlPO_4$ is formed on the surface of the lithium manganese composite of Formula (1).

[Formation of Carbon Coating]

After the lithium manganese composite oxide represented by Formula (1) is coated with the metal-containing compound, it is further coated with the carbon coating. The method for forming the carbon coating is not specifically limited, but examples thereof include the methods shown as [Adsorption step 2-1] and [Adsorption step 2-2] in FIG. 1. These carbon coating forming methods may be used alone, or they may be used in combination so as to form two or more layers of carbon coatings having different properties.

[Adsorption Step 2-1]

The method for forming the carbon coating shown as Adsorption step 2-1 (FIG. 1) is specifically a method in which a porphyrin compound, a phthalocyanine compound, or a polycyclic aromatic hydrocarbon (hereinafter, the porphyrin compound, the phthalocyanine compound, and the polycyclic aromatic hydrocarbon may be simply referred to as "porphyrin compound or the like") is adsorbed onto at least a part of a surface of the above-described lithium manganese composite oxide coated with the metal-containing compound, followed by heat treatment under inert gas atmosphere to pyrolyze the adsorbed porphyrin compound or the like, and thus the carbon coating is formed on the lithium manganese composite oxide or the coated metal-containing compound.

The porphyrin compound and the phthalocyanine compound that can be used in Adsorption step 2-1 each may be a compound free from metal or a complex containing metal. Examples of the metal to be coordinated include Fe, Co, Ni, Cu, and Mg. In this embodiment, at least one selected from a porphyrin compound free from metal, a phthalocyanine compound free from metal, a porphyrin complex containing metal, and a phthalocyanine complex containing metal is preferably used, and two or more selected from these may be used in combination. Further, the porphyrin compound and the phthalocyanine compound may have a substituent, and although the substituent is not specifically limited, examples thereof include carboxyl group, carbonyl group, hydroxyl group, methyl group, and ethyl group. The above-described porphyrin compound and phthalocyanine compound have planar molecules, and they can be efficiently adsorbed onto the surface of the lithium manganese composite oxide.

Further, a polycyclic aromatic hydrocarbon can be used in Adsorption step 2-1 instead of the porphyrin compound or the phthalocyanine compound. The polycyclic aromatic hydrocarbon is not particularly limited, but naphthalene, anthracene, pentacene, pyrene, triphenylene, corannulene, coronene, and ovalene, for example, are more preferable.

Examples of the method for allowing the porphyrin compound or the like to be adsorbed onto the surface of the lithium manganese composite oxide include the liquid phase method or the gas phase method, but a method in which the porphyrin compound or the like is adsorbed onto the surface of the lithium manganese composite oxide in the liquid phase (solvent) is preferable. For example, the lithium manganese composite oxide may be dispersed and mixed in a solution in which the porphyrin compound or the like has been dissolved, or the porphyrin compound or the like and the lithium manganese composite oxide may be added together to a solvent, followed by mixing. Further, after the porphyrin compound or the like and the lithium manganese composite oxide are mixed, techniques such as the concentration and drying method and the impregnation method may be used, or the solvent may be removed by suction filtration. Examples of the solvent to be used for the adsorption of the porphyrin compound or the like include aqueous solvents and organic solvent systems. As the organic solvent systems, tetrahydrofuran (THF), acetonitrile, dichloromethane, or the like, is preferable. As the aqueous solvents, sulfuric acid, nitric acid, hydrochloric acid, or the like, is preferable.

The mixing ratio of the porphyrin compound or the like and the lithium manganese composite oxide represented by Formula (1) in Adsorption step 2-1 is not specifically limited, but is preferably 0.1:99.9 to 20:80, more preferably 1:99 to 10:90, by mass ratio. The use amount of the solvent is not specifically limited, but the solvent is preferably used so that the mass concentration of the porphyrin compound or the like is 1 to 20 mass % with respect to the total mass of the porphyrin compound or the like and the solvent.

By performing the heat treatment step in Adsorption step 2-1, the carbon coating is formed on at least a part of the surface of the lithium manganese composite oxide. The heat treatment step can be performed under inert gas atmosphere such as argon gas, under nitrogen atmosphere, under hydrogen atmosphere, under atmosphere combining two or more of these gases, or under vacuum atmosphere. The heat treatment temperature is preferably in the range of 400 to 1000° C., more preferably in the range of 500 to 800° C. When the heating temperature is excessively low, there are cases where the porphyrin compound or the like cannot be decomposed. Meanwhile, when the heating temperature is excessively high, there are cases where the lithium manganese composite oxide is melted to be enlarged. Further, the heat treatment time is not specifically limited, but is preferably not less than 20 minutes, further preferably not less than 30 minutes, more preferably not less than 60 minutes, and is preferably not more than 3 hours. At this time, the formed carbon coating may be reacted and bonded with the lithium manganese composite oxide on which the metal-containing compound has been adsorbed at the interface, so as to form a fused material.

Adsorption step 2-1 will be specifically described according to a method for allowing the porphyrin compound or the like to be adsorbed by the liquid phase method as an example.

After a porphyrin compound, a phthalocyanine compound, a polycyclic aromatic hydrocarbon or the like is dispersed in a solvent to produce a solution thereof, a Li-excess lithium manganese composite oxide represented by Formula (1) with the metal-containing compound film formed on its surface is added thereto. Then, the lithium manganese composite oxide having the metal-containing compound film is dispersed in the solution using ultrasound or the like, followed by suction filtration, thereby allowing the lithium manganese composite oxide having the porphyrin compound or the like adsorbed on at least a part of its surface to be obtained. Subsequently, the porphyrin compound or the like adsorbed on the lithium manganese composite oxide is pyrolyzed, for example, by heat treatment at 600° C. under inert atmosphere, so that a carbon layer (carbon coating) is stacked on the metal-containing compound coating the lithium manganese composite oxide and on the lithium manganese composite oxide (Adsorption step 2-2 in FIG. 1). At this time, the metal-containing compound on the lithium manganese composite oxide and carbon, or the lithium manganese composite oxide and carbon may be fused respectively at their interfaces to form fused materials. Further, it is also possible to improve the crystallinity of the carbon coating by increasing the heat treatment temperature up to 800° C.

[Adsorption Step 2-2]

The method for forming the carbon coating shown in Adsorption step 2-2 (FIG. 1) is specifically a method in which the carbon coating is formed on the lithium manganese composite oxide using a carbon source by the chemical vapor deposition method (CVD) or the like.

The carbon coating can be formed in Adsorption step 2-2, for example, by sputtering, arc deposition, and chemical deposition. In particular, the chemical vapor deposition method (CVD) that is a chemical deposition is preferable in that the deposition temperature and the deposition atmosphere are easily controlled.

In the case of using CVD, a method in which a sample obtained by heat treatment of the lithium manganese composite oxide on which the metal compound has been adsorbed as above (that is, the lithium manganese composite oxide having the metal-containing compound film) is put into a boat of alumina, quartz, or the like, or is floated or delivered in a gas, for example, can be mentioned.

As the carbon source compound used in the CVD reaction, a compound that generates carbon by pyrolysis can be appropriately selected. Examples of the carbon source compound that can be used include hydrocarbon compounds such as methane, ethane, ethylene, and acetylene, organic solvents such as methanol, ethanol, benzene, and toluene, and CO. Further, examples of the atmosphere gas that can be used include inert gases such as argon, nitrogen gas, or a mixed gas of hydrogen with these gases. The temperature in the CVD reaction is preferably adjusted to 400 to 900° C. Further, the time during which the CVD process is performed is not specifically limited, but is preferably not less than 5 minutes, more preferably not less than 20 minutes, and is preferably not more than 3 hours. At this time, the adsorbed carbon coating may be reacted and bonded with the lithium manganese composite oxide on which the metal-containing compound has been adsorbed at the interface, so as to form a fused material.

The flow rate of the carbon source and the atmosphere gas during the CVD reaction is preferably in the range of 1 mL/min to 10 L/min. The flow rate of the carbon source is more preferably 10 mL/min to 500 mL/min, in which case more uniform coating can be achieved. Further, the flow rate of the atmosphere gas is more preferably in the range of 100 mL/min to 1000 mL/min. The pressure is preferably in the range of 10 to 10000 Torr, more preferably 400 to 850 Torr.

[Configuration of Lithium Ion Secondary Battery]

In this embodiment, the lithium manganese composite oxide having a metal-containing compound film and a carbon coating obtained above can be used as an electrode material (electrode active material), preferably as a positive electrode material (positive electrode active material), of lithium ion secondary batteries.

(Positive Electrode)

In this embodiment, a positive electrode can be produced by forming a positive electrode active material layer including the positive electrode material obtained above, a binder, and, as needed, a conductive agent on a positive electrode current collector.

Examples of the conductive agent include graphite, acetylene black, Ketjen black, carbon fibers, carbon nanotubes, carbon nanohorns, and graphene sheets, and one of these may be used alone, or a mixture of two or more of these may be used.

Examples of the binder include polyvinylidene fluoride (PVdF), vinylidene fluoride-hexafluoropropylene copolymer, vinylidene fluoride-tetrafluoroethylene copolymer, styrene-butadiene copolymerization rubber, polytetrafluoroethylene, polypropylene, polyethylene, polyimide, and polyamide imide. The amount of the binder to be used for the positive electrode is preferably 1 to 10 parts by mass with respect to 100 parts by mass of the positive electrode material.

(Negative Electrode)

A negative electrode can be produced by forming a negative electrode active material layer including a negative electrode active material, a binder, and, as needed, a conductive agent on a negative electrode current collector.

The negative electrode active material is not specifically limited as long as it can be used as a negative electrode active material of lithium secondary batteries, and the examples thereof include carbonaceous materials, typically graphite, silicon, and compounds thereof. These may be used in mixture of two or more of these.

The binder and the conductive agent are not specifically limited, and materials used for the positive electrode may be used.

(Current Collector)

As the current collector, foils, sheets, flat plates, or the like that are made of nickel, aluminum, copper, aluminum alloy, stainless steel, carbon, or the like can be used.

(Electrolyte)

The electrolyte that can be used is a non-aqueous solvents containing, as support salts, lithium salts such as $LiPF_6$, $LiClO_4$, $LiBF_4$, $LiAlO_4$, $LiAlCl_4$, $LiSbF_6$, $LiSCN$, $LiCl$, and $LiCF_3SO_3$. These support salts may be used alone or in a mixture of two or more of these.

Examples of the non-aqueous solvents of the electrolyte include cyclic carbonates such as propylene carbonate, ethylene carbonate, and butylene carbonate, and fluorides thereof; chain carbonates such as dimethyl carbonate, diethyl carbonate, and ethyl methyl carbonate, and fluorides thereof; γ-lactones such as γ-butyrolactone; chain ethers such as 1,2-diethoxyethane and ethoxy methoxy ethane; cyclic ethers such as tetrahydrofuran and dioxolan; and amides such as dimethylformamide, dimethylacetamide, and N-methyl-2-pyrrolidone. Further, in an embodiment, a solvent having high voltage resistance such as fluorinated ether and fluorinated phosphoric acid ester is preferably used in combination. One of the non-aqueous solvents may be used alone, or in combination of two or more of these.

(Separator)

A porous insulating separator that insulates and separates the positive electrode and the negative electrode from each other is provided between them. The separator is not specifically limited, but porous resin films, cellulose films, nonwoven fabrics, or the like that are made of polyethylene, polypropylene, or the like can be used.

(Outer Package)

An outer package is not specifically limited, but examples thereof include outer films such as aluminum laminate films, metal cases, and resin cases. Examples of the shape of an electric storage device include cylindrical, rectangular, coin-like, and sheet shapes.

According to an aspect, the lithium ion secondary battery of this embodiment has a positive electrode formed of a positive electrode current collector made of metal such as aluminum foils and a positive electrode active material layer provided thereon and including the positive electrode material of this embodiment, and a negative electrode formed of a negative electrode current collector made of metal such as copper foils and a negative electrode active material layer provided thereon and including a negative electrode active material. The positive electrode and the negative electrode are stacked via a separator made of non-woven fabrics, polypropylene microporous films, or the like, so that the positive electrode active material layer and the negative electrode active material layer are opposed to each other. This electrode pair is housed in a container formed by the outer package such as aluminum laminate films. A positive electrode tab is connected to the positive electrode current collector, while a negative electrode tab is connected to the negative electrode current collector, and these tabs are drawn out of the container. The container is injected with an electrolyte and is sealed. Another possible structure is that having electrode groups housed in the container, in which the electrode group has a plurality of stacked electrode pairs.

EXAMPLES

Hereinafter, the present invention will be described by way of examples, but the present invention is not limited by the following examples.

Preparation of Positive Electrode Material

Preparation Example 1

A solution (Solution 1) obtained by dissolving 1 ml of butyl titanate in 100 ml of ethanol, and a solution (Solution 2) obtained by mixing 200 ml of ethanol, 50 ml of water, and 50 ml of acetic acid were prepared. While stirring the Solution 2, Solution 1 was mixed with Solution 2 dropwise to produce a Ti sol. In the produced Ti sol solution, $Li_{1.26}Mn_{0.52}Fe_{0.22}O_2$ (Mn213) (Sample A) was dispersed, followed by filter separation, and thereby Sample B in which a Ti compound was adsorbed on the surface of Sample A was obtained. Thereafter, heat treatment was performed at 500° C. for 3 hours in the air, and thus a positive electrode material in which the surface of Sample A was coated with titanium oxide (TiO$_2$) was obtained. A porphyrin solution obtained by dissolving 5 mg of a porphyrin compound free from metal in 40 ml of THF was prepared, and 100 mg of the resultant sample was dispersed in the porphyrin solution, followed by filter separation, thereby allowing a porphyrin compound to be adsorbed onto the surface. Thereafter, the porphyrin compound adsorbed on the positive electrode material was pyrolyzed by heat treatment at 650° C. for 60 minutes under Ar atmosphere (500 ml/min), so as to fuse with the positive electrode material, so that a carbonaceous material was formed on the surface. The crystallinity of the carbon coating was improved by further increasing the temperature up to 800° C., and thus Sample C1 was obtained. As a result of thermogravimetric analysis under oxygen atmosphere, carbon components were combusted at about 400° C., and it was found from the reduced weight that the amount of adsorbed carbon is 2 wt % of the total mass of Sample C1.

Preparation Example 2

Sample B produced in Preparation Example 1 was heated to 700° C. under Ar atmosphere in an electric furnace, and CVD was performed for 15 minutes by bubbling with an Ar gas using toluene as a carbon source, so that Sample C2 was obtained. At this time, the flow rate of Ar was 300 ml/min. The sample after the CVD was subjected to thermogravimetric analysis under oxygen atmosphere. As a result, carbon components were combusted at about 400° C., and it was found from the reduced weight that the amount of adsorbed carbon is 4 wt % of the total mass of Sample C2.

Figure 2:
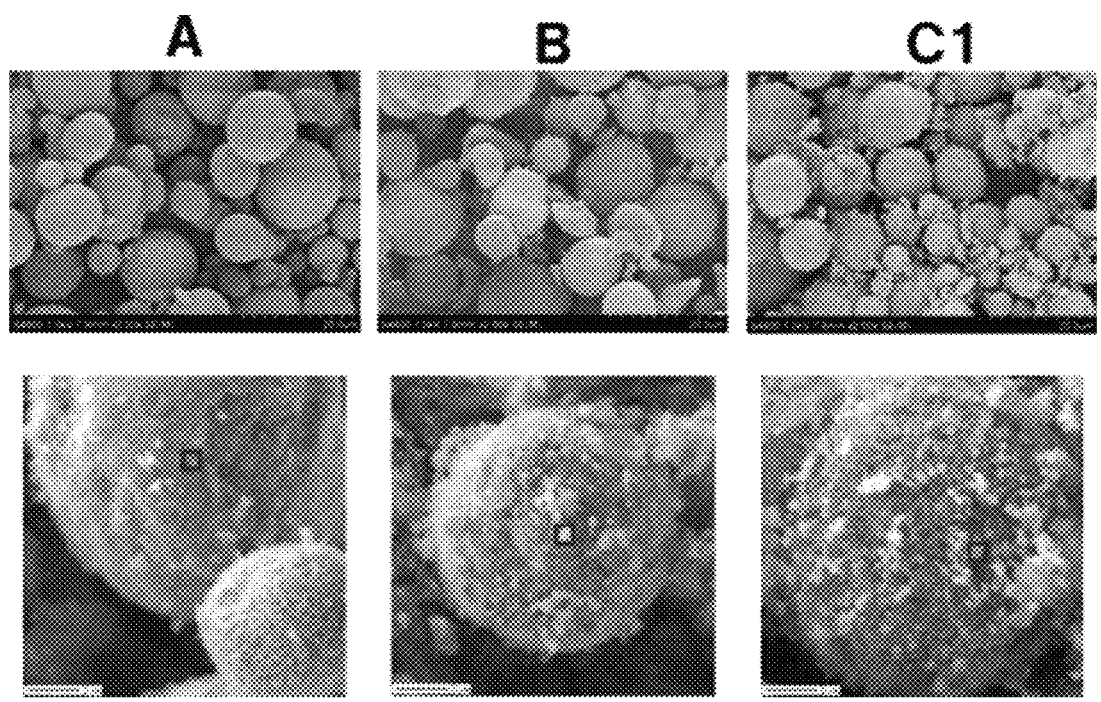
FIG. 2 is an SEM image of a lithium manganese composite oxide in an example of the present invention.

FIG. 2 is an SEM (scanning electron microscope) image of Samples A, B, and C1 produced in Preparation Example 1. It was seen from an enlarged view that the surface was roughened by Ti coating and carbon coating. Further, it was confirmed from the SEM image of Sample C1 that carbon was precipitated as an impurity, and it was found that the surface was not uniformly coated with the entire content of carbon. Here, the scale of the horizontal axis is 2 µm. The range indicated by the square (☐) was subjected to elemental analysis by EDX (Energy Dispersive X-ray spectroscopy). As a result, although Ti was not observed in Sample A, Ti was observed in Samples B and C1, and it was seen that Ti was adsorbed on their surfaces. Further, in Sample C1, about 2 wt % of carbon was observed, and it was seen that a carbon coating was formed on its surface.

Comparative Example 1

A paste was prepared by mixing Sample A as a positive electrode material, polyvinylidene fluoride (PVdF) as a binder, and carbon black as a conductive agent at 92:4:4 (mass ratio) and using N methyl-2-pyrrolidone as a solvent. The obtained paste was applied to an Al foil for a current collector to a thickness of 70 µm. Then, after drying at 120° C. for 1 hour, an electrode was press-molded by a roller press. It was punched to 2 cm$^2$, which was used as a positive electrode. As a counter electrode, graphite was used. As an electrolyte, 1 M LiPF$_6$ was mixed with ethylene carbonate and dimethyl carbonate having a volume ratio of 4:6. As a separator, a 30 µm porous polyethylene film was used, and thus a lithium ion secondary battery cell for evaluation was produced. The obtained cell was set in a charge and discharge testing machine, and charge and discharge were performed in the voltage region of 4.8 V-2.0 V. The discharge capacity when discharged at a current of 5 mA/g, 20 mA/g, and 40 mA/g, and the capacity retention rate after 20 cycles of charge and discharge at a constant current of 20 mA/g were determined. The capacity retention rate was calculated as a ratio (%) of the discharge capacity at the 20th cycle with respect to the discharge capacity at the first cycle.

Comparative Example 2

The discharge capacity and the capacity retention rate were determined in the same manner as in Comparative Example 1 except that Sample B was used as the positive electrode material.

Example 1

The discharge capacity and the capacity retention rate were determined in the same manner as in Comparative Example 1 except that Sample C1 was used as the positive electrode material.

Example 2

The discharge capacity and the capacity retention rate were determined in the same manner as in Comparative Example 1 except that Sample C2 was used as the positive electrode material.

Table 1 shows the comparison results of the discharge characteristics and the capacity retention rate of Examples 1 and 2, and Comparative Examples 1 and 2.

TABLE 1

| | Positive electrode material | Discharge capacity (mAh/g) | | | Capacity retention rate after 20 cycles |
|---|---|---|---|---|---|
| | | Discharge (5 mA/g) | Discharge (20 mA/g) | Discharge (40 mA/g) | |
| Comparative Example 1 | A | 200 mAh/g | 175 mAh/g | 150 mAh/g | 70% |
| Comparative Example 2 | B | 195 mAh/g | 175 mAh/g | 150 mAh/g | 80% |
| Example 1 | C1 | 210 mAh/g | 200 mAh/g | 190 mAh/g | 85% |
| Example 2 | C2 | 205 mAh/g | 200 mAh/g | 185 mAh/g | 85% |

It can be seen from the capacity retention rate after 20 cycles that the cycle characteristics were improved by coating with the metal-containing compound. This is because the dissolution of Mn or the dissolution of gases or the like were suppressed. It was also found that the rate characteristics were improved by further coating with carbon. This is because the resistance between the active materials was reduced due to the coating with carbon. Further, it was demonstrated from the comparison of Samples B, C1, and C2 that the C rate does not significantly change due to the production process of the carbon coating. In Samples B, C1, and C2, the capacity retention rate after 20 cycles was improved, which is considered to result from the suppression of the dissolution of metal or the like. In Samples C1 and C2, as compared to Sample B, the capacity retention rate after cycles was higher, indicating that both of the metal-containing compound and carbon contribute the suppression of the dissolution.

(Supplementary Note)

In this embodiment, the following aspects are also preferable.

(Supplementary Note 1)

A lithium manganese composite oxide having a metal-containing compound film and a carbon coating, wherein at least a part of a surface of a lithium manganese composite oxide represented by Formula (2) is coated with the metal-containing compound film, and at least a part of the surface thereof is further coated with the carbon coating.

$$Li_{1-x}(Fe_yNi_zMn_{1-y-z})_{1-x}O_2 \qquad (2),$$

where $0<x<\frac{1}{3}$, $0 \leq y$, $0 \leq z < 0.5$, and $y+z<1$.

(Supplementary Note 2)

The lithium manganese composite oxide having a metal-containing compound film and a carbon coating according to Supplementary Note 1, wherein the metal-containing compound is one or more selected from the group consisting of oxides and phosphate compounds of a metal, and the metal is at least one selected from the group consisting of Ti, Al, Fe, Mg, K, Na, Zn, Ce, Ca, Zr, Ge and Sn.

(Supplementary Note 3)

The lithium manganese composite oxide having a metal-containing compound film and a carbon coating according to Supplementary Note 2, wherein the metal-containing compound is at least one selected from the group consisting of $TiO_2$, $Al_2O_3$, $FePO_4$, $MgO$, $CeO_2$, $ZnO$, $SnO_2$, $ZrO_2$, and $AlPO_4$.

(Supplementary Note 4)

The lithium manganese composite oxide having a metal-containing compound film and a carbon coating according to any one of Supplementary Notes 1 to 3, wherein each of the metal-containing compound film and the carbon coating has a mass of not more than 20 mass % with respect to a mass of the lithium manganese composite oxide represented by Formula (2).

(Supplementary Note 5)

The lithium manganese composite oxide having a metal-containing compound film and a carbon coating according to any one of Supplementary Notes 1 to 4, wherein the metal-containing compound film is formed by heat treatment of one or more metal compounds selected from the group consisting of metal inorganic salts, organometallic compounds, metal complexes, and metal alkoxides, and a metal constituting the metal compound is at least one selected from the group consisting of Ti, Al, Fe, Mg, K, Na, Zn, Ce, Ca, Zr, Ge, and Sn.

(Supplementary Note 6)

The lithium manganese composite oxide having a metal-containing compound film and a carbon coating according to any one of Supplementary Notes 1 to 5, wherein the carbon coating is formed by heat treatment of at least one selected from a porphyrin compound, a phthalocyanine compound, and a polycyclic aromatic hydrocarbon.

(Supplementary Note 7)

The lithium manganese composite oxide having a metal-containing compound film and a carbon coating according to any one of Supplementary Notes 1 to 5, wherein the carbon coating is formed by a chemical vapor deposition method.

(Supplementary Note 8)

A lithium ion secondary battery electrode comprising the lithium manganese composite oxide having a metal-containing compound film and a carbon coating according to any one of Supplementary Notes 1 to 7 as an electrode active material.

(Supplementary Note 9)

The lithium ion secondary battery electrode according to Supplementary Note 8, which is a positive electrode.

(Supplementary Note 10)

A lithium ion secondary battery comprising the electrode according to Supplementary Note 8 or 9.

(Supplementary Note 11)

A method for producing a lithium manganese composite oxide having a metal-containing compound film and a carbon coating, comprising the steps of:

coating at least a part of a surface of a lithium manganese composite oxide represented by Formula (2) with the metal-containing compound, and further coating, with the carbon coating, at least a part of the surface of the lithium manganese composite oxide coated with the metal-containing compound.

(Supplementary Note 12)

The method for producing a lithium manganese composite oxide having a metal-containing compound film and a carbon coating according to Supplementary Note 11, wherein the step of coating with the metal-containing compound comprises the steps of:

allowing at least one metal compound selected from the group consisting of a metal inorganic salt, an organometallic compound, a metal complex, and a metal alkoxide to be adsorbed by a liquid phase method onto the surface of the lithium manganese composite oxide represented by Formula (2), and forming the metal-containing compound film on at least a part of the surface of the lithium manganese composite oxide represented by Formula (2) by heat treatment.

(Supplementary Note 13)

The method for producing a lithium manganese composite oxide having a metal-containing compound film and a carbon coating according to Supplementary Note 12, wherein the step of allowing the metal compound to be adsorbed by the liquid phase method comprises the steps of:

preparing a metal sol solution from at least one metal compound selected from the group consisting of metal inorganic salts, metalorganometallic compounds, metal complexes, and metal alkoxides, dispersing the lithium manganese composite oxide represented by Formula (2) in the metal sol solution, and allowing the metal sol to be adsorbed onto the surface of the lithium manganese composite oxide represented by Formula (2).

(Supplementary Note 14)

The method for producing a lithium manganese composite oxide having a metal-containing compound film and a carbon coating according to any one of Supplementary Notes 11 to 13, wherein the step of coating with the carbon coating comprises the steps of:

allowing at least one selected from the group consisting of porphyrin compounds, phthalocyanine compounds, and polycyclic aromatic hydrocarbons to be adsorbed by a liquid phase method onto the surface of the lithium manganese composite oxide having the metal-containing compound film obtained by the step of coating with the metal-containing compound, and forming the carbon coating on at least a part of the surface of the lithium manganese composite oxide having the metal-containing compound film by heat treatment.
(Supplementary Note 15)
The method for producing a lithium manganese composite oxide having a metal-containing compound film and a carbon coating according to any one of Supplementary Notes 11 to 13, wherein the step of coating with the carbon coating comprises the step of:
forming the carbon coating by a chemical vapor deposition method on at least a part of the surface of the lithium manganese composite oxide having the metal-containing compound film obtained by the step of coating with the metal-containing compound.

The invention claimed is:

1. A lithium manganese composite oxide having a metal-containing compound film and a carbon coating, wherein
at least a part of a surface of the lithium manganese composite oxide represented by Formula (1):

$$Li_{1+x}(Fe_yNi_zMn_{1-y-z})_{1-x}O_2 \qquad (1),$$

where $0<x<\frac{1}{3}$, $0 \leq y$, $0 \leq z < 0.5$, and $y+z<1$
is coated with the metal-containing compound film, and at least a part of the surface thereof is further coated with the carbon coating,
wherein the carbon coating is formed by heat-treating the lithium manganese composite oxide at a temperature of 650 degrees Celsius or more in the presence of a carbon source.

2. The lithium manganese composite oxide having a metal-containing compound film and a carbon coating according to claim 1, wherein
the metal-containing compound is one or more selected from the group consisting of oxides and phosphate compounds of a metal, and
the metal is at least one selected from the group consisting of Ti, Al, Fe, Mg, K, Na, Zn, Ce, Ca, Zr, Ge and Sn.

3. The lithium manganese composite oxide having a metal-containing compound film and a carbon coating according to claim 1, wherein
the metal-containing compound film and the carbon coating each has a mass of not more than 20 mass % with respect to a mass of the lithium manganese composite oxide represented by Formula (1).

4. The lithium manganese composite oxide having a metal-containing compound film and a carbon coating according to claim 1, wherein the metal containing compound film is formed by heat treatment of one or more metal compounds selected from the group consisting of metal inorganic salts, organometallic compounds, metal complexes, and metal alkoxides, and a metal constituting the metal compound is at least one selected from the group consisting of Ti, Al, Fe, Mg, K, Na, Zn, Ce, Ca, Zr, Ge, and Sn.

5. The lithium manganese composite oxide having a metal-containing compound film and a carbon coating according to claim 1, wherein
the carbon coating is formed by heat treatment of at least one selected from the group consisting of porphyrin compounds, phthalocyanine compounds, and polycyclic aromatic hydrocarbons.

6. The lithium manganese composite oxide having a metal-containing compound film and a carbon coating according to claim 1, wherein
the carbon coating is formed by a chemical vapor deposition method.

7. A lithium ion secondary battery comprising the lithium manganese composite oxide having a metal-containing compound film and a carbon coating according to claim 1 as an electrode active material.

8. The lithium manganese composite oxide having a metal containing compound film and a carbon coating according to claim 1, wherein the metal-containing compound covers the surface of the lithium manganese composite oxide in the range of not less than 5% and not more than 50%.

9. The lithium manganese composite oxide having a metal-containing compound film and a carbon coating according to claim 1, wherein the carbon coating has a mass of 2 mass % to 4 mass % with respect to a total mass of the lithium manganese composite oxide having the metal-containing compound film and the carbon coating.

10. The lithium manganese composite oxide having a metal-containing compound film and a carbon coating according to claim 1, wherein
the metal-containing compound is one or more selected from the group consisting of oxides and phosphate compounds of a metal, and
the metal is at least one selected from the group consisting of Ti, Fe, K, Na, Zn, Ce, Ca and Zr.

11. The lithium manganese composite oxide having a metal-containing compound film and a carbon coating according to claim 1, wherein the content of the carbon is 2 mass % or more and not more than 30 mass % with respect to the mass of the lithium manganese composite oxide.

* * * * *